(12) United States Patent
Sanghavi et al.

(10) Patent No.: US 11,961,171 B1
(45) Date of Patent: Apr. 16, 2024

(54) INTERACTIVE MEDIA OBJECT SYSTEM WITH MODULAR-BASED FEATURE

(71) Applicant: Roku, Inc., San Jose, CA (US)

(72) Inventors: Mehul Sanghavi, San Jose, CA (US); Rachel Elise Bailin, Los Angeles, CA (US); Thomas Paul DeGarmo, Jr., Malvern, PA (US); Prajit Jose Madan, Dublin, CA (US); David Anthony Webb, Milpitas, CA (US); Andrew Laurence Ashbacher, Aptos, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/364,092

(22) Filed: Aug. 2, 2023

Related U.S. Application Data

(60) Provisional application No. 63/516,707, filed on Jul. 31, 2023.

(51) Int. Cl.
  *G06T 11/60* (2006.01)
  *G06F 3/0482* (2013.01)
  *G06F 3/04845* (2022.01)

(52) U.S. Cl.
  CPC ............ *G06T 11/60* (2013.01); *G06F 3/0482* (2013.01); *G06F 3/04845* (2013.01)

(58) Field of Classification Search
  CPC ..... G06T 11/60; G06F 3/0482; G06F 3/04845
  See application file for complete search history.

(56) References Cited

U.S. PATENT DOCUMENTS

| | | | |
|---|---|---|---|
| 2013/0080641 A1* | 3/2013 | Lui | H04L 47/70 709/226 |
| 2013/0268437 A1* | 10/2013 | Desai | G06Q 20/3674 705/41 |
| 2014/0020068 A1* | 1/2014 | Desai | G06Q 20/3227 726/4 |
| 2017/0006135 A1* | 1/2017 | Siebel | G06Q 10/06 |
| 2018/0027006 A1* | 1/2018 | Zimmermann | H04L 63/0227 726/11 |
| 2018/0329993 A1* | 11/2018 | Bedadala | G06F 16/90332 |
| 2019/0171438 A1* | 6/2019 | Franchitti | G06F 16/9538 |
| 2020/0285788 A1* | 9/2020 | Brebner | G06F 18/251 |
| 2021/0294829 A1* | 9/2021 | Bender | G06F 16/345 |
| 2021/0319781 A1* | 10/2021 | Gullo | G06F 40/166 |
| 2022/0222623 A1* | 7/2022 | Stump | G06F 16/285 |

(Continued)

*Primary Examiner* — YuJang Tswei
(74) *Attorney, Agent, or Firm* — McDonnell Boehnen Hulbert & Berghoff LLP

(57) ABSTRACT

In one aspect, an example method can be used with a system comprising a set of domain specific language (DSL)-compatible modules. The method can include: (i) designing a template for an interactive media object, wherein the template includes one or more fixed portions and one or more variable portions; (ii) curating the designed template by at least using received input to modify the one or more variable portions of the designed template; (iii) modifying the curated template by replacing a content placeholder of the curated template with a corresponding content item, thereby automatically converting the curated template into an interactive media object definition file; and (iv) using the interactive media object definition file to render and present, via a media selection menu of a presentation device, an interactive media object defined by the interactive media object definition file.

19 Claims, 9 Drawing Sheets

(56) References Cited

U.S. PATENT DOCUMENTS

| | | | |
|---|---|---|---|
| 2023/0206096 A1* | 6/2023 | Paiement | G06N 3/08 706/52 |
| 2023/0230091 A1* | 7/2023 | Vaughn | G06Q 20/4016 705/71 |

* cited by examiner

*— 400*

| Interactive Media Object Information | 402 |

Name [ ]

Template: Auto Showroom A

---

Global     404

Title [ ]

Top left logo [Upload] or [ ] [Search]

---

Page 1     406

Background image [Upload] or [ ] [Search]

---

Page 2     408

INTERACTIVE MEDIA OBJECT SYSTEM WITH MODULAR-BASED FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method can be used in connection with a system comprising a set of domain specific language (DSL)-compatible modules including (i) a template design module, (ii) a template curation module, (iii) a content services module, and (iv) a rendering module. The method can include: (i) designing, by the template design module, a template for an interactive media object, wherein the template includes one or more fixed portions and one or more variable portions; (ii) curating, by the template curation module, the designed template by at least (a) prompting for input via a user interface, (b) receiving input via the user interface, and (c) using the received input to modify the one or more variable portions of the designed template; (iii) modifying, by the content service module, the curated template by replacing a content placeholder of the curated template with a corresponding content item, thereby automatically converting the curated template into an interactive media object definition file; and (iv) using, by the rendering module, the interactive media object definition file to render and present, via a media selection menu of a presentation device, an interactive media object defined by the interactive media object definition file.

In another aspect, an example computing system is disclosed. The computing system includes one or more processors and one or more non-transitory computer-readable storage media having stored thereon program instructions that upon execution by the processor, cause the computing system to perform a set of acts for use in connection with a set of domain specific language (DSL)-compatible modules including (i) a template design module, (ii) a template curation module, (iii) a content services module, and (iv) a rendering module. The set of acts can include (i) designing, by the template design module, a template for an interactive media object, wherein the template includes one or more fixed portions and one or more variable portions; (ii) curating, by the template curation module, the designed template by at least (a) prompting for input via a user interface, (b) receiving input via the user interface, and (c) using the received input to modify the one or more variable portions of the designed template; (iii) modifying, by the content service module, the curated template by replacing a content placeholder of the curated template with a corresponding content item, thereby automatically converting the curated template into an interactive media object definition file; and (iv) using, by the rendering module, the interactive media object definition file to render and present, via a media selection menu of a presentation device, an interactive media object defined by the interactive media object definition file.

In another aspect, an example one or more non-transitory computer-readable media is disclosed. The computer-readable media has stored thereon program instructions that upon execution by a processor, cause a computing system to perform a set of acts for use in connection with a set of domain specific language (DSL)-compatible modules including (i) a template design module, (ii) a template curation module, (iii) a content services module, and (iv) a rendering module. The set of acts can include (i) designing, by the template design module, a template for an interactive media object, wherein the template includes one or more fixed portions and one or more variable portions; (ii) curating, by the template curation module, the designed template by at least (a) prompting for input via a user interface, (b) receiving input via the user interface, and (c) using the received input to modify the one or more variable portions of the designed template; (iii) modifying, by the content service module, the curated template by replacing a content placeholder of the curated template with a corresponding content item, thereby automatically converting the curated template into an interactive media object definition file; and (iv) using, by the rendering module, the interactive media object definition file to render and present, via a media selection menu of a presentation device, an interactive media object defined by the interactive media object definition file.

BRIEF DESCRIPTION OF THE DRAWINGS

FIG. 4 is a screenshot of an example user-interface associated with curating an example template.

DETAILED DESCRIPTION

I. Overview

Figure 1:
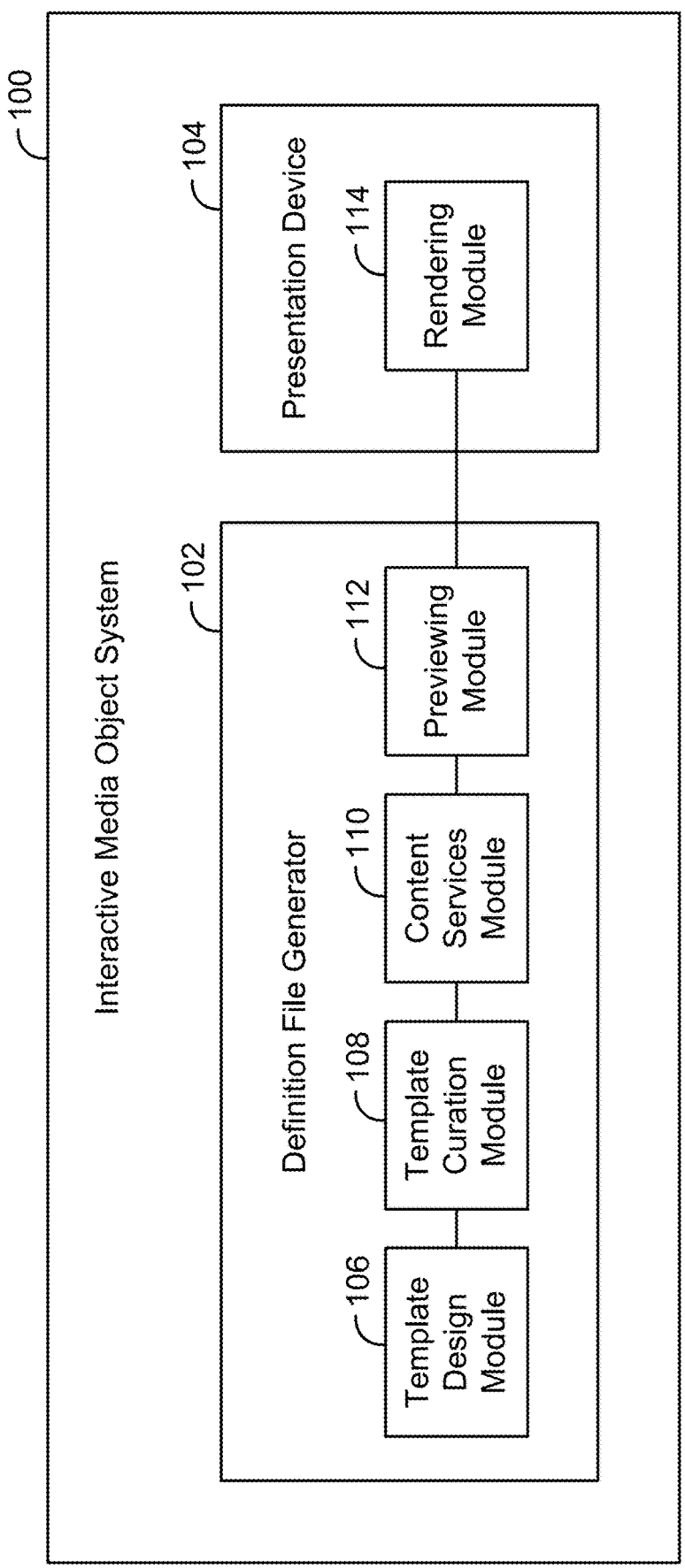
FIG. 1 is a simplified block diagram of an example streaming-media system in which various described principles can be implemented.

In the context of advertisements being presented within media selection menus of televisions, generating and modifying such advertisement can be a time-consuming and resource intensive process. Indeed, a traditional approach involves a tedious process by which a software engineer, perhaps with the help of some limited templating functionality, hard-codes an advertisement definition file that specifies various properties of the advertisement. With this traditional approach, any desired modifications to the advertisement likewise involve a tedious and time-consuming engineering effort to modify that hard-coded definition file.

Moreover, due to the difficultly in generating such advertisements, combined with the limited types of user interface inputs generally available on televisions (often essentially limited to directional navigation buttons and a select button), traditional advertisements like these can often be basic and/or boring for users.

The disclosed systems and methods help to address these and other issues by, among other things, providing an interactive media object system having multiple modules that communicate and operate according to a unified domain specific language (DSL). Among other things, this allows various functions and operations to be decoupled from each other, allowing for improved flexibility and configurability. Moreover, the various modules can function and communicate in such as way so as to allow for a simpler and more efficient process for generating, modifying, and presenting interactive advertisements or other interactive media objects, without the need to manually hard-code a definition file, as with the traditional approach described above.

More specifically, according to one example implementation, an interactive media object system can include multiple DSL-compatible modules such as (i) a template design module, (ii) a template curation module, (iii) a content services module, and (iv) a rendering module. According to the example implementation, the template design module can design a template for an interactive media object, where the template includes one or more fixed portions and one or more variable portions. Next, the template curation can curate the designed template by prompting for input via a user interface, receiving input via the user interface, and using the received input to modify the one or more variable portions of the designed template. Then, the content services module can modify the curated template by replacing a content placeholder of the curated template with a corresponding content item, thereby automatically converting the curated template into an interactive media object definition file. And finally, the rendering module can use the interactive media object definition file to render and present, via a media selection menu of a television or other presentation device, an interactive media object defined by the interactive media object definition file.

The interactive media object system can include various other DSL-compatible modules and can perform various other operation as well. For example, the system can further include a DSL-compatible preview module that previews an interactive media object represented by the interactive media object definition file, where the previewing occurs before the using of the interactive media object definition file to render and present, via the media selection menu of the presentation device, the interactive media object defined by the interactive media object definition file.

Among other things, these and other examples of the disclosed systems and methods provide a more efficient, dynamic, and scalable approach to generating, modifying, and presenting interactive advertisements or other types of interactive media objects on televisions or other type of presentation devices. Moreover, the disclosed systems and methods help facilitate generating interactive media objects that provide rich experiences for users, which users are generally likely to find more interesting and engaging, even in situations where a given presentation device includes a generally limited amount of user interface inputs (e.g., essentially just directional navigation buttons and a select button). These and other operations and related features and benefits are described in greater detail below.

II. Example Architecture

A. Interactive Media Object System

FIG. 1 is a simplified block diagram of an example interactive media object system 100. Generally, the interactive media object system 100 can perform operations related to generating, modifying, and presenting interactive media objects. An interactive media object can take various forms. For example, it can take the form of an interactive advertisement to be presented via a media selection menu of a user interface of a presentation device, for example. However, interactive media objects can also take other forms and/or can be used or presented in other contexts, such as in connection with presenting an interactive game or an interactive shopping experience, and/or in the context of being presented within some other portion of a user interface, for instance.

Generally, media (and therefore one or more portions of an interactive media object) can include a video component and/or an audio component and there can be various types and examples of media. For instance, media can be or include a media program such as a movie or a television show episode, an advertisement for media or for a product or service, among numerous other possibilities.

The interactive media object system 100 can include various components, such as a definition file generator 102 and a presentation device 104. Generally, the definition file generator 102 can generate and/or modify an interactive media object definition file that defines an interactive media object, and can transmit the interactive media object definition file to the presentation device 104, such that the presentation device can receive and use the interactive media object definition file to present the defined interactive media object, such as within a media presentation menu of a user interface of the presentation device 104.

Each of these components can take various forms. For example, the presentation device 104 can take the form of a television and/or a streaming media player (perhaps connected to a television), among numerous other possibilities. In practice, one or more of these can be integrated with another. For instance, in one example, a presentation device 104 can take the form of a television with an integrated streaming media player.

Returning back to the interactive media object system 100, this can also include a set of domain specific language (DSL)-compatible modules, which can be arranged in various ways within the interactive media object system 100. For example, the set of DSL-compatible modules can include a template design module 106, a template curation module 108, a content services module 110, and a previewing module 112, all of which can be included within the definition file generator 102, as shown in FIG. 1. The set of DSL-compatible modules can also include a rendering module 114, which can be included in the presentation device 104, as shown in FIG. 1. However, other arrangements are possible as well.

The interactive media object system 100 can also include one or more connection mechanisms that connect various components within the interactive media object system 100. For example, the interactive media object system 100 can include the connection mechanisms represented by lines connecting components of the interactive media object system 100, as shown in FIG. 1.

In this disclosure, the term "connection mechanism" means a mechanism that connects and facilitates communication between two or more devices, systems, other entities, and/or components thereof. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

Generally, the presentation device 104 can interface with a user via a user interface, and/or obtain and present media items and/or interactive media objects. For example, the presentation device 104 can select a channel from among multiple available channels, perhaps based on input received via a user interface, such that the presentation device 104 can select and/or obtain media on the selected channel. In some example, each such a channel may be associated with a given publisher and publisher system. In addition, the presentation device 104 can present interactive media objects such as within a media selection menu of the user interface of the presentation device 104. The presentation device 104 can render and present an interactive media object in various ways and in various places, such as within the media selection menu.

The presentation device 104 can output media and/or an interactive media object for presentation in various ways. For example, in the case where the presentation device 104 is a television, outputting the media for presentation can involve the television outputting the media or interactive media object via a user interface (e.g., a display screen and/or a sound speaker), such that it can be presented to an end-user. As another example, in the case where the presentation device 104 is a media streaming player, outputting the media for presentation can involve the media streaming player outputting the media or interactive media object via a communication interface (e.g., an HDMI interface), such that it can be received by a television and in turn output by the television for presentation to an end-user. In connection with presenting an interactive media object, the presentation device 104 can also prompt a user for input via the user interface, and responsively receive input via the user interface. The presentation device 104 can then use the input to modify the interactive media object in accordance with a corresponding the interactive media object definition file.

Returning to the interactive media object system 100, with each of the modules of the system being DSL-compatible modules, each may be configured to communicate with one or more of the other modules in accordance with a given DSL. Likewise, each DSL-compatible module may be able to perform various file-related operations specific to the given DSL, such as exporting, importing, transmitting, receiving, opening, generating, modifying, saving, and/or otherwise processing a file that adheres to the given DSL. For instance, in one example implementation, the DSL can be JSON-file-based, and as such, the one or more modules described above can perform the described operations in the context of JSON files. More specifically, for example, the template design module 106 could generate a template in the form of a DSL file, which it can transmit to the template curation module 108, which can curate the template (by modifying the JSON file). The template curation module 108 can then transmit the modified template (in the form of a JSON file) to the content services module 110, which can modify the curated template further by replacing content placeholders with content, thereby converting the curated template to a definition file (by modifying the JSON file), and can transmit the definition file (in the form of a JSON file) to the previewing module 112, which can use the definitions file (in the form of a JSON file) to preview a corresponding interactive media object. The content services module 110 can also transmit the definition file (in the form of a JSON file) to the rendering module 114, which can interpret the definition file (in the form of a JSON file) and render and present the corresponding interactive media object via a user interface of the presentation device 104. These and other example operations are discussed in greater detail below.

Also, for the sake of clarity, it should be noted that the example provided in FIG. 1 is for illustration purposes only. In practice, it is likely that a given interactive media object system 100 will include many more components and/or instances of components shown and described. As such, in practice, interactive media object system 100 can be of a much larger scale than suggested by the example shown. Indeed, in some examples, the interactive media object system 100 can allow for interactive media object definition files to be provided to a large number of rendering modules and/or to a large number of presentation device, perhaps thousands or more, and may further allow for interactive media objects to be presented to a larger number of users, perhaps thousands or more, at various times and in different ways in various media selection menus of presentation devices.

More generally, in some instances, the interactive media object system 100 and/or components thereof can include multiple instances of at least some of the described components. The interactive media object system 100 and/or components thereof can take the form of a computing system, an example of which is described below.

B. Computing System

Figure 2:
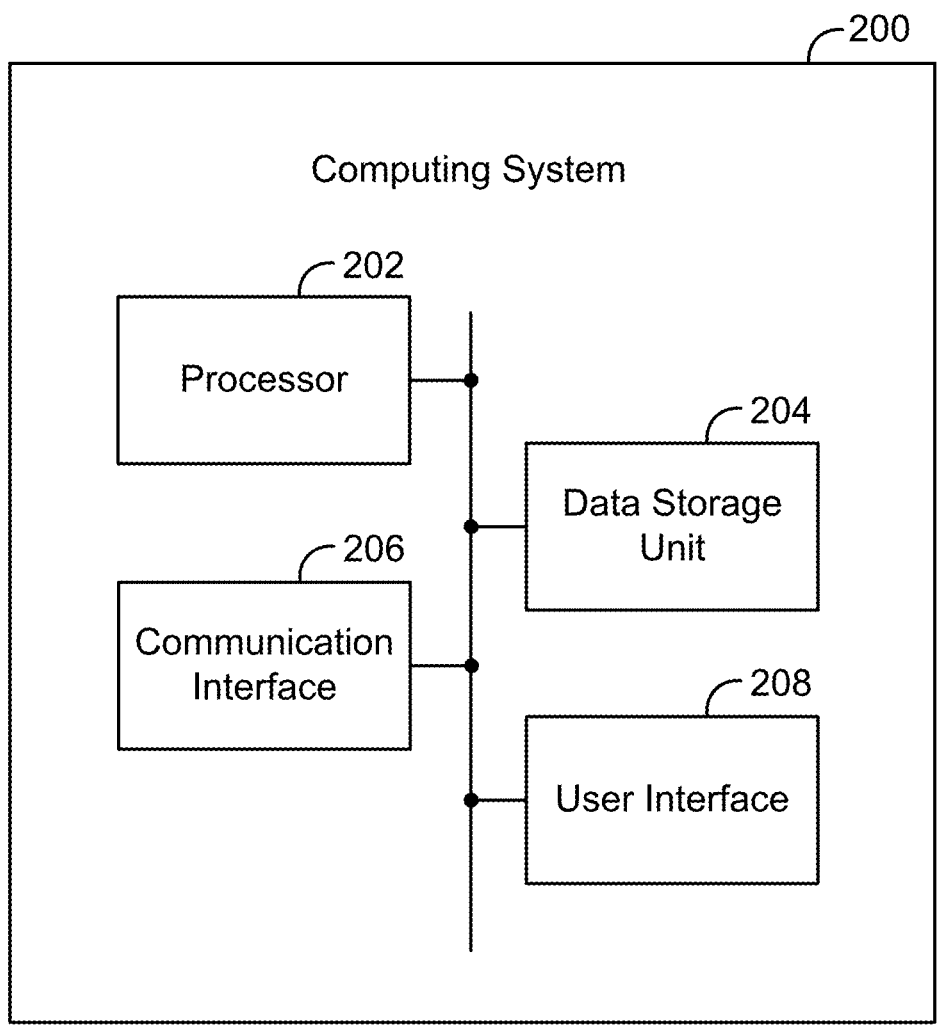
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the interactive media object system 100 and/or components of the interactive media object system 100 can take the form of a computing system, such as the computing system 200. In some cases, some or all of these entities can take the form of a more specific type of computing system, such as a desktop or workstation computer, a laptop, a tablet, a mobile phone, a television, a set-top box, a streaming media player, a head-mountable display device (e.g., virtual-reality headset or an augmented-reality headset), and/or a wearable device (e.g., a smart watch), among numerous other possibilities.

Although example architecture has been described above, the above-described components, systems, and/or other entities can be configured in various other ways as well. For example, the above-described components, systems, and/or other entities can be combined and/or split into different components, systems, and/or other entities, for instance.

III. Example Operations

The interactive media object system 100, the computing system 200, and/or components of either can be configured to perform and/or can perform various operations, such as the example operations described below.

To begin, the template design module 106 can design a template for an interactive media object. Generally, the template can define at least some of the characteristics and behaviors of the interactive media object, including the visual characteristics of the media object and how the interactive media object responds to user interactions.

In one example, the template can define the interactive media object by defining one or more components of the object and one or more interactions of the object. The one or more components can be arranged as a hierarchy and can include one component that is a root component, which serves as the starting point for the interactive media object. An interaction can be defined to have a trigger condition and one or more actions, which can be arranged as a hierarchy as well.

A component can take various forms and can be a visual element of the interactive media object. For example, a component can be an image, a video, a label, a button, a pageset, a page, a pager, an overhang, a scrollbar, an item list, or a stacked item list, among numerous other possibilities. Each component can be defined to itself include one or more components, and/or or to include one or more interactions.

A trigger condition can take various forms. For example, a trigger condition can be a condition that there has been receipt of a particular input (e.g., via the user interface). Other examples include a condition that an event has occurred, a key/button (e.g., a directional button or a select button on a remote control) has been pressed, a key/button has been released, a component is in focus, a component is blurred, a component has been shown, a component has been hidden, media playback associated with a component has started, media playback associated with a component has started has paused, media playback associated with a component has started has resumed, media playback associated with a component has started, media playback associated with a component has stopped, or media playback associated with a component has finished, among numerous other possibilities. An action can take various forms. For example, an action can be an action to set focus, animate, fade in, fade out, show, hide, navigate to, play media, pause media, resume media, or stop media, among numerous other possibilities.

A given trigger condition can target a particular component. For example, in the case where the trigger condition related to being in focus, the trigger condition can more specifically be a condition that a given component is in focus. Likewise, a given action can target a particular component. For example, in the case where an action is an action to set focus, the action can specify the component for which focus should be set.

Figure 3:
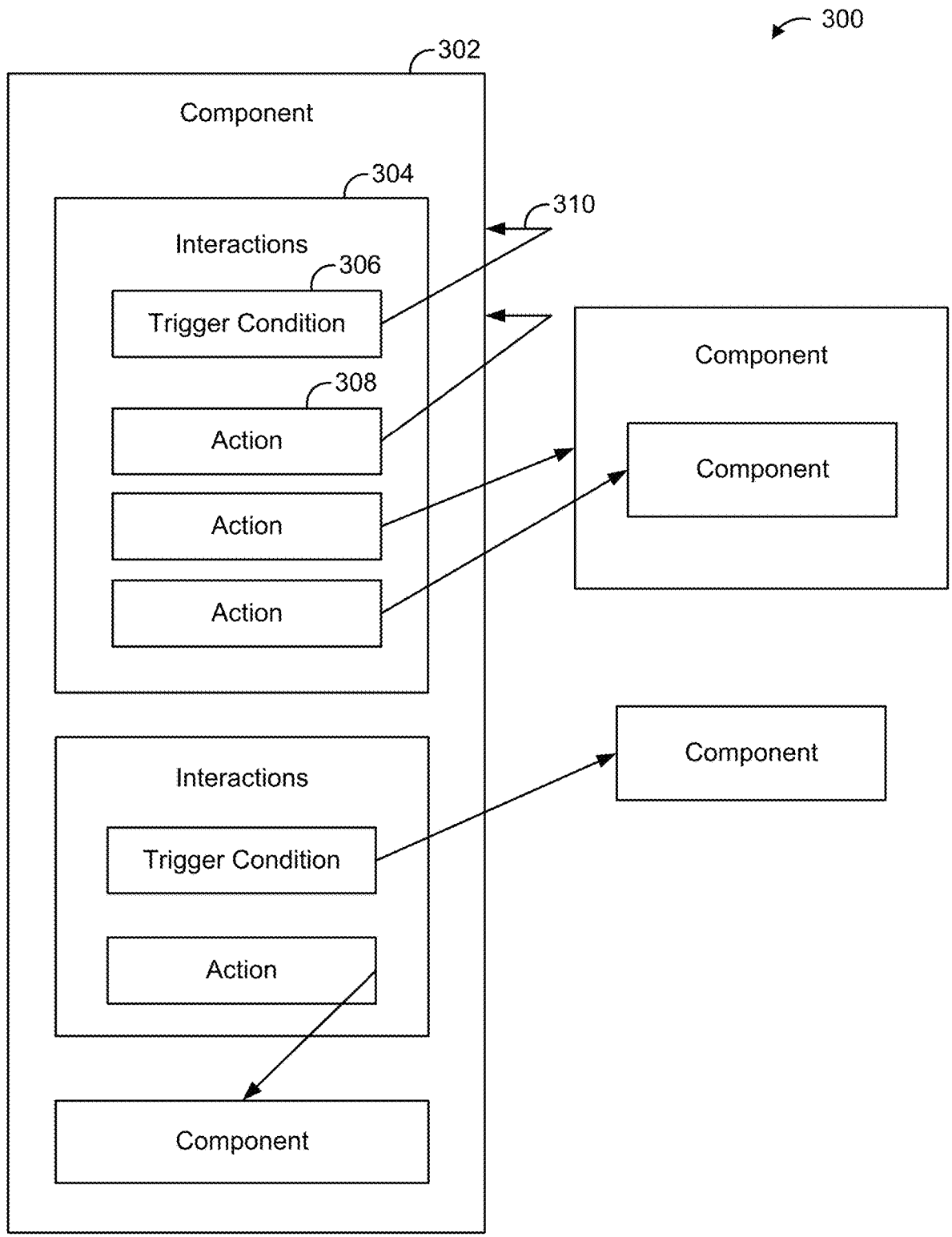
FIG. 3 is a depiction of various elements of an example template.

FIG. 3 is a depiction of various elements of an example template 300. As shown, the template 300 includes multiple components, interactions, trigger conditions, actions, and target indicators (in the form of target links), including for example, a component 302, interactions 304, a trigger condition 306, an action 308, and a target link 310 (linking trigger condition 306 to component 3302), among several other examples as show in FIG. 3. As noted above, the elements of a template can also have a hierarchy, examples of which are depicted by the elements being visually nested within one or more other elements. Elements of the template can also have metadata, such as to specify the various parameters/options such as ones noted above or related thereto. For instance, in the case of a component, the component may include additional details to identify a name of the component, the type of the component, in the case where the component is an image, the image file or perhaps a placeholder associated with at image, etc. The other elements can likewise have appropriate metadata as well.

As noted above, a template can define a corresponding interactive media object, such as by defining at least some of the characteristics and behaviors of the interactive media object, including the visual characteristics of the media object and how the interactive media object responds to user interactions. The template can use the various elements of the template as described above to do this.

In one example, the template can include one or more fixed elements and one or more variable elements, which are all defined by the template. As such, the template can act as a wireframe and can provide some level of structure and stability (by way of the fixed elements) while also providing some level of flexibility and configurability (by way of the variable elements).

After the template design module 106 designs a template for an interactive media object, the template curation module 108 can then select the designed template. In one example, the template design module 106 can design multiple templates, which the template design module 106 can make accessible to the template curation module 108. As such, the template curation module 108 can present, via a user interface, a list of selectable templates, and can then select, based on input received from a user via the user interface, a given one of the templates, such as the designed template as discussed above.

The template curation module 108 can then curate the designed template. The template curation module 108 can do this in various ways. For example, this can involve, prompting a user for input, receiving input, and using the received input to modify the one or more variable elements of the designed template. When prompting for input, the template curation module 108 can present metadata associated with the variable elements and/or otherwise assist the user (e.g., with appropriate labels) to help guide the user as to what type of input to provide. In some examples, the variable elements and corresponding prompts may be grouped to help a user visualize the corresponding portions of the interactive media object. For example, in the case where the interactive media object includes multiple components, each representing a different page or visual state of the interactive media object, the variable elements of each respective page or visual state may be grouped together and presented within a respective section of the user interface.

In instances when there the variable elements prompt for insertion of media or other content (e.g., images, audio items, or video items), in one example, the user can select a content item. However, alternatively, the user can insert a content idem placeholder into the variable element field. For example, the user can insert a content identifier that corresponds to a content item sought to be inserted into that field.

FIG. 4 is a screenshot of an example user interface associated with curating an example template. Among other things, as shown, a user interface 400 includes multiple sections 402, 404, 406, and 408. The example template is a template for an "auto showroom" type of interactive advertisement that can be used to promote one or more automobiles and/or related goods/services with various fixed and variable elements (the variable elements being the ones that can be modified via the user interface 400 and/or by another user interface component.

Section 402 includes interactive media object information, and includes a field for a user to enter a name of the interactive media object, and indicates the selected template. Section 404 includes information associated with a global component of the template, including a field for a user to enter a title and a section to select a logo to be added to a top left area of across all pages of the interactive media object. Section 406 includes information about a first page of the interactive media object, including a section to select an image to be added as a background image for that page. Section 408 includes information about a second first page of the interactive media object, and so on. In various examples, the user interface 400 can also be configured such that such a user can click the title of or otherwise select a given section or portion thereof to modify associated metadata, perhaps by way of editing a corresponding file. Among other things, this can allow the user to further configure elements such as the interactions associated with the template. For instance, the user can specify what trigger conditions cause what actions, and in connection with what components. For example, the user can specify that if a given remote control button is pressed, that causes given a set of actions, such as to fade out the first page, and fade in the second page, as one simple example. In practice, the template can be configured in a far more detailed manner, allowing for interactive media objects that provide rich interactive media experiences for users.

After the template curation module 108 curates the template, the content services module 110 can modify the curated template by replacing a content placeholder of the curated template with a corresponding content item, thereby automatically converting the curated template into an interactive media object definition file. Thus, for example, in the case where a variable element has a media item identifier inserted into a given field, the content services module 110 can use the media item identifier as a basis to select and retrieve the corresponding media item (e.g., from a data storage unit of the content services module 110), such that the media item can be inserted into the variable element, in place of the placeholder. After any such replacements are performed, the modified template can thus be considered an interactive media object definition file.

Within a data storage unit, such as a data storage unit of the content services module 110, media can be represented by media data, which can be generated, stored, and/or organized in various ways and according to various formats and/or protocols, using any related techniques now know or later discovered. For example, the media data can be stored and organized as a Multimedia Database Management System (MDMS) and/or in various digital file formats, such as the MPEG-4 format, among numerous other possibilities.

The media data can represent the media by specifying various properties of the media, such as video properties (e.g., luminance, brightness, and/or chrominance values), audio properties, and/or derivatives thereof. In some instances, the media data can be used to generate the represented media. But in other instances, the media data can be a fingerprint or signature of the media, which represents the media and/or certain characteristics of the media and which can be used for various purposes (e.g., to identify the media or characteristics thereof), but which is not sufficient at least on its own to generate the represented media.

In some instances, media can include or be associated with metadata, which can also be stored in one or more data storage units (e.g., within the content services module 110). There can be various types of metadata. In the case where the media includes video and audio, the audio may generally be intended to be presented in sync together with the video. To help facilitate this, the media data can include metadata that associates portions of the video with corresponding portions of the audio. For example, the metadata can associate a given frame or frames of video with a corresponding portion of audio. In some cases, audio can be organized into one or more different channels or tracks, each of which can be selectively turned on or off, or otherwise controlled. Video data can also include other types of metadata associated with the video. Other types of content (e.g., text-based content) can likewise be stored and retrieved in various ways.

Notably, in some instances, the template may not have any content placeholders (e.g., containing media identifiers for media items) and as such, there may be no need for the content services module 110 to replace content placeholders with content items. As such, in some examples, the act of the template curation module 108 curating the template may result in the template curation module 108 converting the template into a definition file, which the template curation module 108 can then provide directly to the previewing module 112 and/or the rendering module 114, as discussed below.

In some instances, in connection with curating the template and/or modifying the curated template by replacing content placeholders with corresponding content items, a user may seek to preview the interactive media object (e.g., before finalizing the interactive media object and thus). To provide this functionality, the previewing module 112 can preview an interactive media object represented by the template or the definition file. Such previewing can occurs via the user interface and before the using of the interactive media object definition file to render and present, via the media selection menu of the presentation device, the interactive media object defined by the interactive media object definition file (as discussed below). Based on the preview, if desired, the user can make further modifications to the template and as such, the template curation module 108 and/or the content services module 110 can repeat some of all of the various operations described above.

After the interactive media object file has been finalized, the rendering module 114 can use the interactive media object definition file to render and present, via a media selection menu of the presentation device 104, an interactive media object defined by the interactive media object definition file, in accordance with the definition file.

The rendering module 114 can begin by rendering and presenting based on the root component of the definition file. The presentation device 104 can then receive input via a user interface of the presentation device 104 (e.g., input from a user interacting with a remote control), and can use the input received to modify the rendering and presentation of the interactive media object in accordance with the interactive media object definition file. In this way, the presentation device 104 can dynamically adjust the presentation of the media object based on instructions in the definition file and/or based on user input in real-time.

Figure 5A:
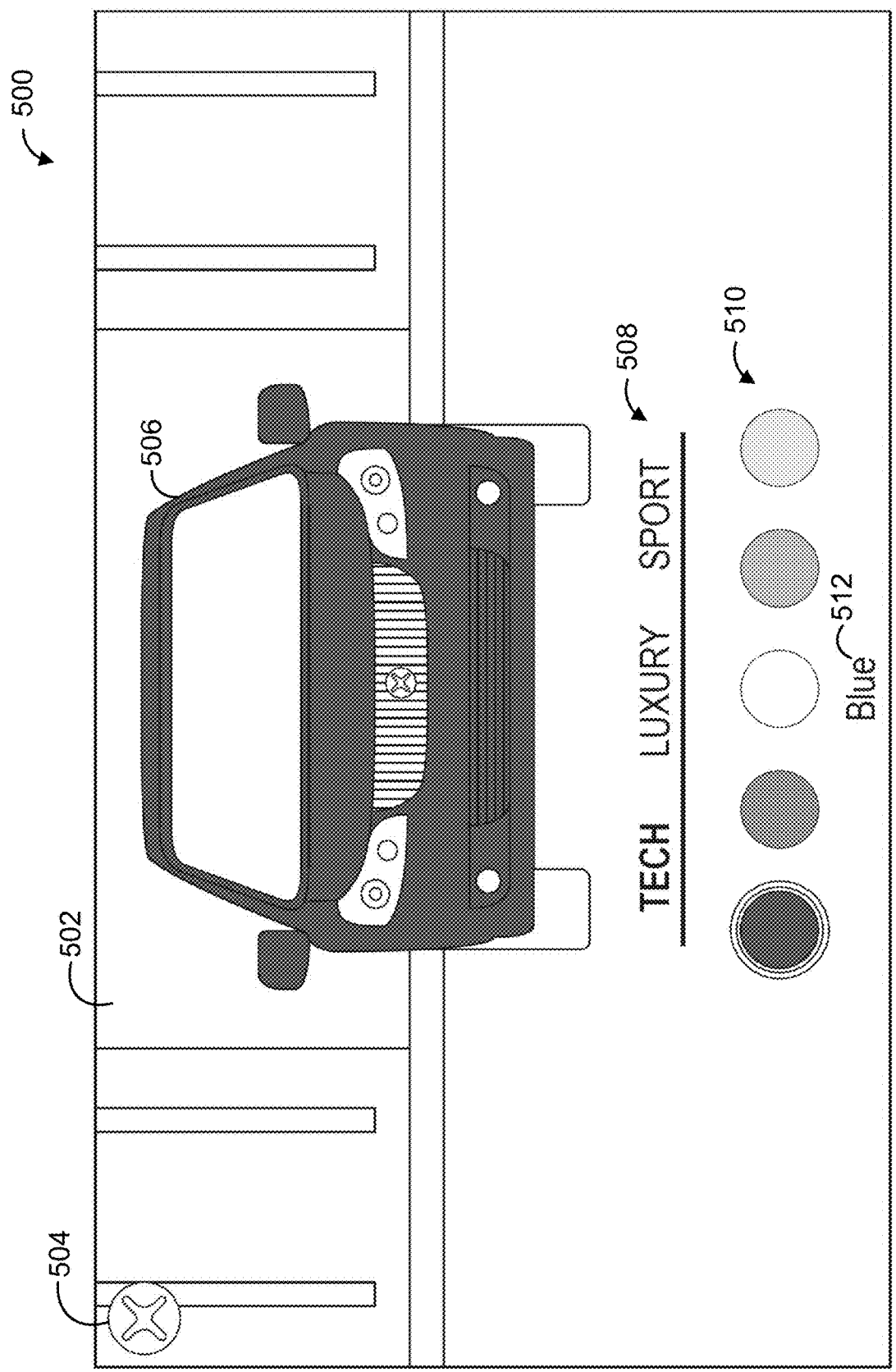
FIG. 5A is a screenshot of an example interactive media object, in a first state.
Figure 5B:
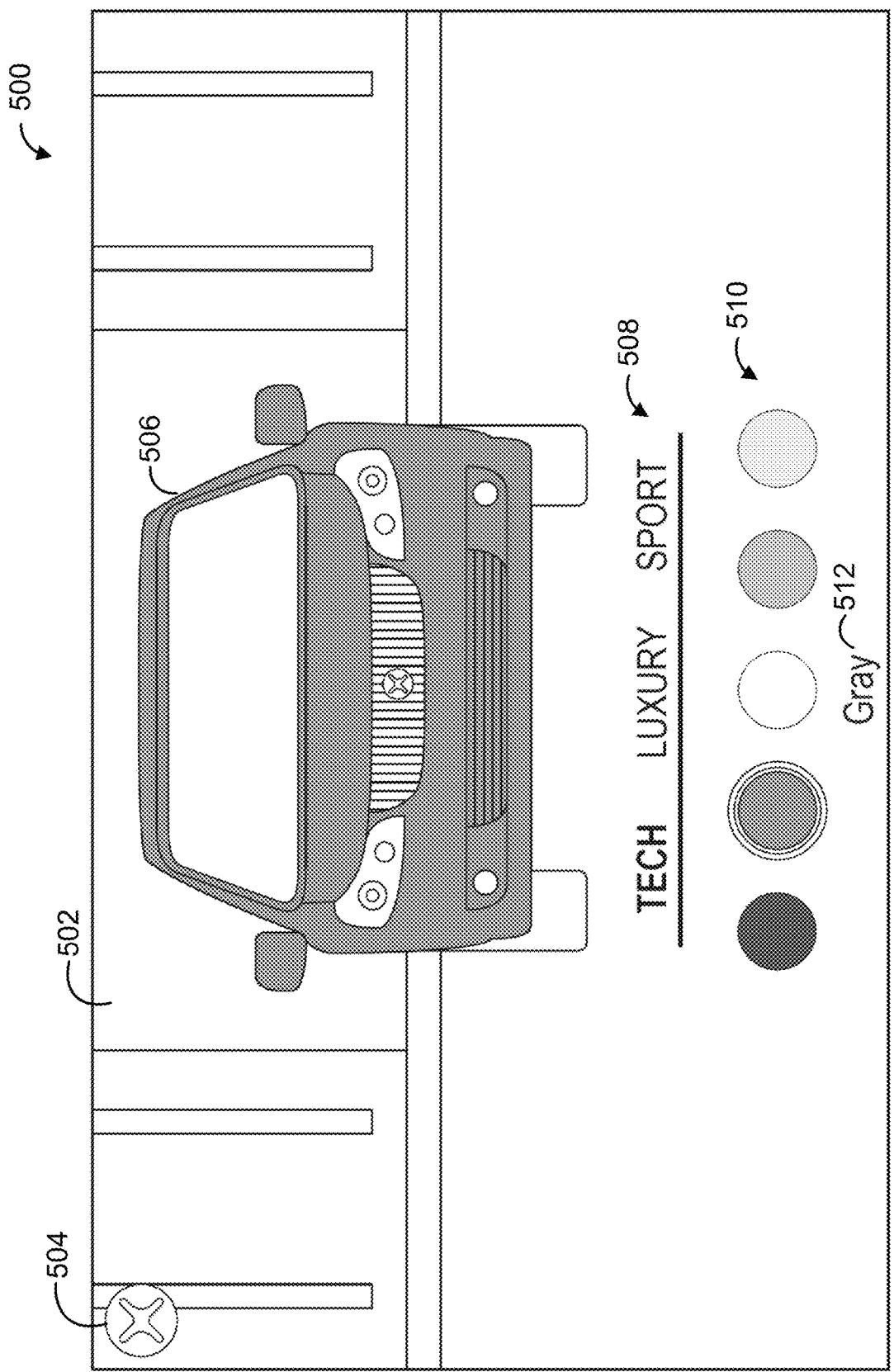
FIG. 5B is a screenshot of an example interactive media object, in a first state.

FIG. 5A is a screenshot of an example interactive media object, in a first state. As shown, the object depicts a background image 502, an overlaid brand logo 504, an overlaid vehicle image 506, a vehicle category selection area 508, a color selection area 510, and a color label 512. Each of these elements and their associated conditions, triggers, links, etc. can be defined by the template and therefore, by the definition file. For example, the definition file can be configured such that, if the user pressed a right button on a remote control, several actions can occur. For example, the circle around the blue color (the leftmost of the five colors in the color selection area 510) can become hidden, a circle around the grey circle (the second to left of the five colors in the color selection area 510) can be shown, the color label text can change from "Blue" to "Grey," and the vehicle image (currently an image of a blue vehicle) can be replaced with a new vehicle image of a gray vehicle. FIG. 5B is a screenshot of the example interactive media object in a second state, showing these changes.

As another example, the definition file can be configured such that, if the user then pressed an up button on the remote control, a box can be drawn around the currently selected category (in this case, "TECH"). The definition file can further be configured, such that if the user pressed a right button, the box around "TECH" would be hidden and instead a box around "LUXURY" would be shown, and if the user pressed an enter key, the word "TECH" would stop being bold, and instead the word "LUXURY" would become bold to indicate that it has been selected.

In one example, some of these and/or other configurations could be contained within a given page of the object. However, there could be instances in which certain input could cause the object to transition to a different page (e.g., a page that provides a purchase/shopping cart interface, or that provides a list of related videos or other information, etc.). It should also be noted that this is a simplistic example, which has been provided for illustration purposes only. In practice, interactive media objects could be much more complex, based on an intricate collection of components, interactions, etc. to provide for rich interactive experiences for users.

In the context of the rendering module 114 rendering and presenting the interactive media object on the presentation device 104, the object may be presented full screen across the entire display screen of the presentation device 104, or alternatively over a smaller portion of the display screen (e.g., contained within a bordered or borderless window within the display screen). In some implementations, one or more of the operations discussed above could be repeated for each of multiple instances of interactive media objects that could be rendered and presented in temporal sequence or perhaps in a temporally overlapping fashion. As such, in some instances, the presentation device 104 could render and present multiple different interactive media objects at the same time, but within distinct windows/areas of the display screen. However, even though each interactive media object may be presented in a different window, the respective definition files could be configured such they are linked together. In other words, an action of one definition file could target a component of the other definition file. As such, in response to a user interacting with a first interactive media object presented in a first window, that interaction could cause a change in behavior in a second interactive media object presented in a second window.

As such, in addition to the rendering module 114 using the second interactive media object definition file to render and present, via a media selection menu of a presentation device 104, a second interactive media object defined by the second interactive media object definition file, the presentation device 104 can receive input associated with the first interactive media object, and can use the input received to modify the rendering and presentation of the second interactive media object in accordance with the second interactive media object definition file.

As another feature, in some situations, it might be desirable to have an interactive media object behave in a certain way and/or interact with a user in a certain way based on user profile data associated with that user. For example, in the case where the user profile data indicates or suggests that a user may prefer using a given user interface element over a different one (e.g., where the user prefers to scroll through certain images up and down as opposed to scrolling left and right, as one simple example) and/or that the user's user interface history indicates that the user is more inclined to use a given user interface element, the interactive media object system 100 could be configured to take such user profile data into account such that it can provide a preferred and/or most suitable interactive media content object experience for the user.

This could be implemented in various ways. For example, multiple templates could be designed, with each being designed based on a particular preference as indicated or suggested by the user profile data. In that case, the template curation module 108 could obtain user provide data associated with the user, and could use at least the obtained user profile data as a basis to select a template. In this way, the template curation module 108 can select a template that is suited to the user's particular preference or that is based on the user's history of using certain user interface elements, and as such, the rendering module 114 could ultimately render and present an interactive media object that is suited to the user's particular preference.

This could also be implemented in other ways. For instance, rather than using the user profile data as a basis to select a template, a given template could define interactions in such as way so as to consider the user profile data and dynamically define elements of the template (e.g., a relating to a trigger condition of the template). As such, in one example, the template could be defined such that (i) in the case where the user profile data indicates that the user prefers to scroll through images up and down as opposed to scrolling left to right, the template could define a user interface in which the user can scroll through certain images based on receiving up and down key commands, but not left and right commands, and (ii) in the case where the user profile data indicates that the user prefers to scroll through certain images left and right as opposed to scrolling up and down, the template could define a user interface in which the user can scroll through images based on receiving left and right commands, but not up and down commands.

For these or other purposes, the template curation module 108, the rendering module 114, or any other component of the interactive media object system 100 can obtain user profile data, of which there can be various types. For example, user profile data can include demographic information, user interface preference information, and/or historical interactive media object interaction data for the user, among numerous other possibilities. Such user profile data can be obtained, stored, organized, and retrieved in various ways, such as by using any related user profile data techniques now known or later discovered. In some instances, user profile data can be obtained, stored, and/or used after the client has provided explicit permission for such operations to be performed.

In other examples, it might be desirable to have an interactive media object behave in a certain way and/or interact with a user in a certain way based on area presentation data associated with the presentation device 104. In the context of the presentation device 104 presenting media, the presentation device 104 and/or the presented media can have an associated presentation area, in which one or more people can view and/or listen to presented media. As one example, in the case where the presentation device 104 is a television in a living room, the presentation area can be the area of the living room where people can view video being presented on a display screen of the television and where people can hear the corresponding audio being presented through sound speakers of the television. In some cases, a presentation area can include at least a portion of one or more other rooms as well. For example, in the case where the living room has a nearby kitchen from which people can also view and/or listen to the presented media, the presentation area can also include at least a portion of that room too. Many other configurations are possible as well and as such, in connection with the given presentation device 104, the associated presentation area can have various different shapes, sizes, dimensions, etc.

Presentation area data can include data obtained directly from a camera, sensor, or another device, or the obtained presentation area data can be data derived from that data. There can be various types of presentation area data associated with the presentation area. For example, presentation area data can include audience data associated with one or more people in the presentation area. For instance, the audience data can include a people count indicating a number of people in the presentation area, or can include one or more user profile identifiers each associated with a respective person in the presentation area.

In the same way that a template could be selected based on obtained user profile data and/or configured to behave in a certain way based on obtained user profile data, the template could likewise be selected based on obtained presentation area data and/or be configured to behave in a certain way based on obtained area presentation data. As such, the rendering module 114 could ultimately render and present an interactive media object that is suited to and/or based on characteristics of the presentation area associated with the presentation device 104.

As noted above, interactive media objects (like the various examples disclosed herein) can take various forms and/or can be used or presented in various contexts, such as in connection with presenting an interactive game or an interactive shopping experience, and/or in the context of being presented within some other portion of a user interface, for instance. In some examples, interactive media objects can be presented as full or partial screen objects, in some cases perhaps within a heads-up display (HUD) element that may be provided to users in the course of providing users with notifications, for example. In other examples, interactive media objects can be overlaid on top of other software application windows or on top of video received via a given input source (e.g., a source associated with a given HDMI input), among numerous other possibilities.

Figure 6:
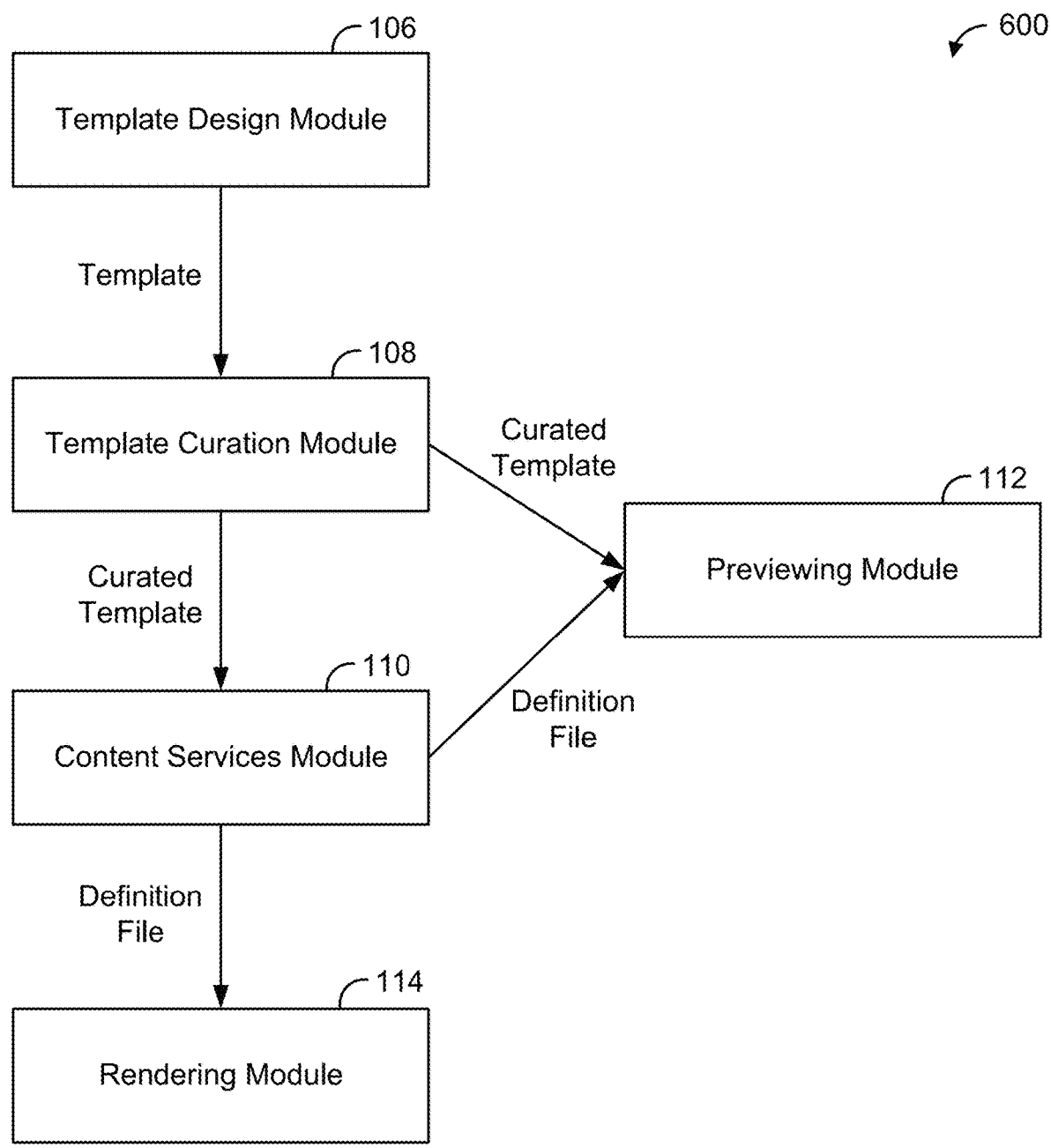
FIG. 6 is a flow chart illustrating example system modules and data flow.

For additional perspective, FIG. 6 is a flow chart illustrating example system modules and data flow. As shown, the template design module 106 can transmit a template to the template curation module 108, which can transmit a curated template to the content services module 110, which can transmit a definition file to the rendering module 114 for presentation of the corresponding interactive media object to the user. In addition, the template curation module 108 can transmit the curated template to the previewing module 112 and/or the content services module 110 and transmit the definition file to the previewing module 112.

Figure 7:
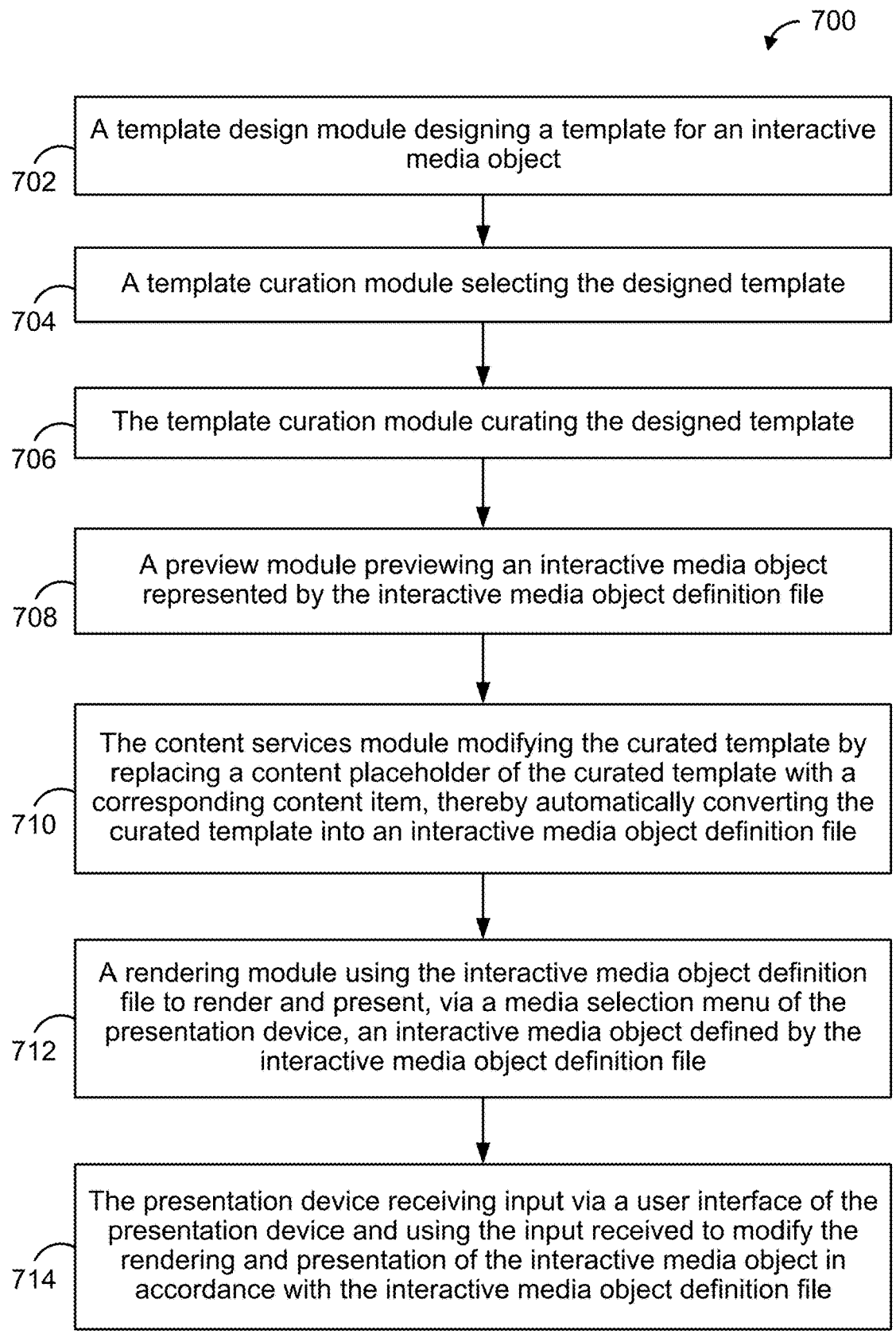
FIG. 7 is a flow chart of an example method.

FIG. 7 is a flow chart illustrating an example method 700 for use in connection with a system comprising a set of domain specific language (DSL)-compatible modules including (i) a template design module, (ii) a template curation module, (iii) a content services module, and (iv) a rendering module. The method 700 can be carried out by the interactive media object system 100 and/or by components thereof, such as the various DSL-compatible modules of the system 100, the presentation device 104, or more generally, by a computing system, such as the computing system 200.

At block 702, the method 700 includes a template design module designing a template for an interactive media object. At block 704, the method 700 can include a template curation module selecting the designed template. At block 706, the method 700 can include the template curation module curating the designed template. At block 708, the method 700 can include a preview module previewing an interactive media object represented by the interactive media object definition file. At block 710, the method 700 can include the content services module modifying the curated template by replacing a content placeholder of the curated template with a corresponding content item, thereby automatically converting the curated template into an interactive media object definition file At block 712, the method 700 can include a rendering module using the interactive media object definition file to render and present, via a media selection menu of the presentation device, an interactive media object defined by the interactive media object definition file. At block 714, the method 700 can include the presentation device receiving input via a user interface of the presentation device and using the input received to modify the rendering and presentation of the interactive media object in accordance with the interactive media object definition file.

Figure 8:
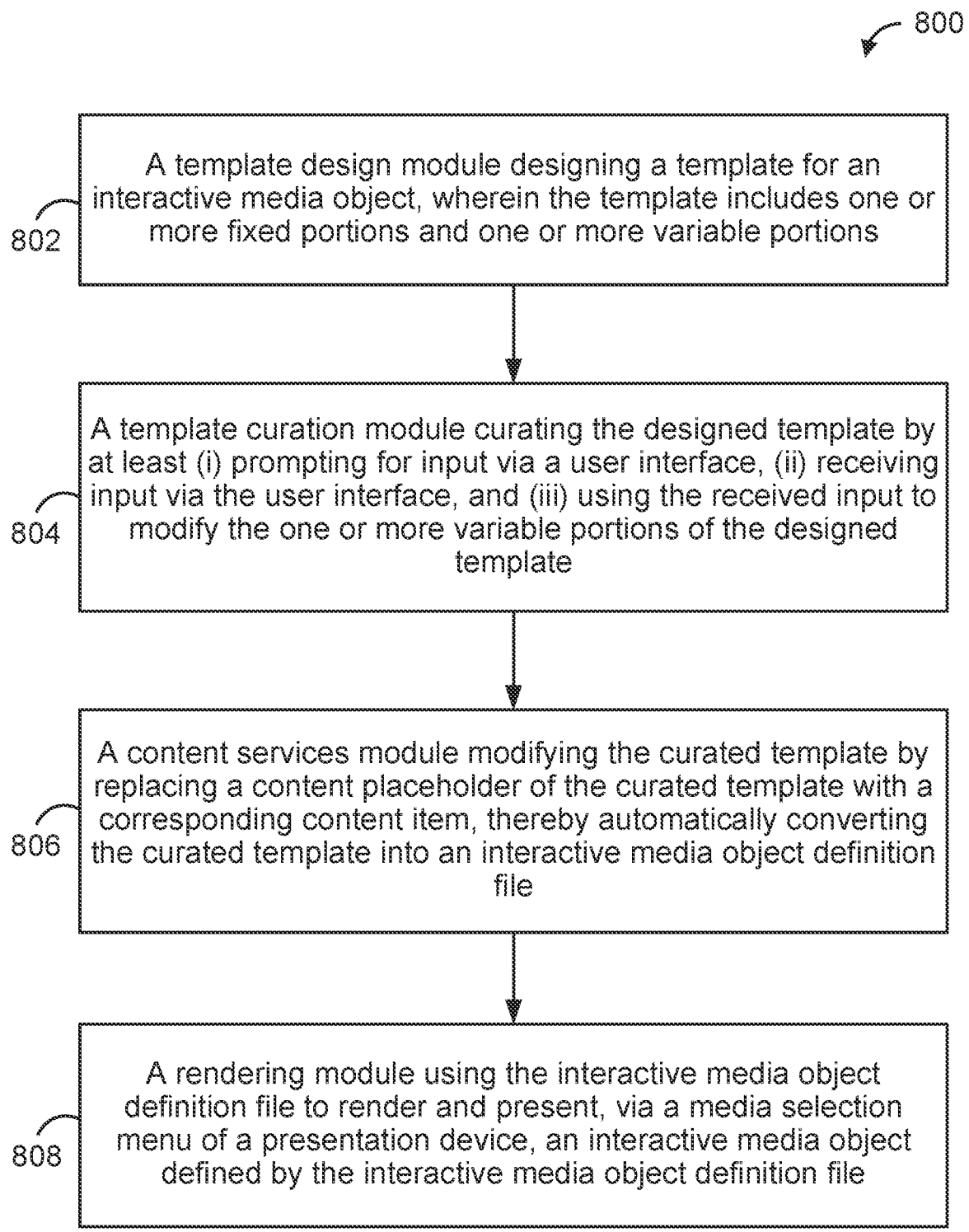
FIG. 8 is a flow chart of another example method.

FIG. 8 is a flow chart illustrating an example method 800. The method 800 can be carried out by the interactive media object system 100 and/or by components thereof, such as the various DSL-compatible modules of the system 100, the presentation device 104, or more generally, by a computing system, such as the computing system 200.

At block 802, the method 800 includes a template design module designing a template for an interactive media object, wherein the template includes one or more fixed portions and one or more variable portions. At block 804, the method 800 includes a template curation module curating the designed template by at least (i) prompting for input via a user interface, (ii) receiving input via the user interface, and (ii) using the received input to modify the one or more variable portions of the designed template. At block 806, the method 800 includes a content services module modifying the curated template by replacing a content placeholder of the curated template with a corresponding content item, thereby automatically converting the curated template into an interactive media object definition file. At block 808, the method 800 includes a rendering module using the interactive media object definition file to render and present, via a media selection menu of a presentation device, an interactive media object defined by the interactive media object definition file.

In some examples, the DSL-compatible modules are JSON file compatible modules, and/or the interactive media object is an interactive advertisement.

In some examples, the designed template defines: a hierarchy of at least two components, wherein each component includes at least one user interface interaction, and wherein each user interface interaction includes at least one trigger condition and at least one action.

In some examples the designed template specifies that at least one of the components is a root component, the designed template specifies that at least one defined components is an image, video, or button component, the designed template specifies that at least one of the defined trigger condition is receipt of a particular input via the user interface, and/or the designed template specifies that at least one of the defined trigger condition is a condition related to user profile data.

In some examples, the method further includes: obtaining user profile data associated with a user of the presentation device; and using the obtained user profile data to modify the rendering and presentation of the interactive media object in accordance with the interactive media object definition file.

In some examples, the designed template specifies that at least one of the defined trigger condition is a condition related to presentation area data. In some examples, the method further includes: obtaining presentation area data associated with a presentation area of the presentation device; and using the obtained presentation area data to modify the rendering and presentation of the interactive media object in accordance with the interactive media object definition file.

In some examples, the designed template specifies that at least one of the defined actions is a media presentation-related action.

In some examples, the set of multiple DSL-compatible modules further includes a preview module, and the method further includes: previewing, by the preview module, an interactive media object represented by the interactive media object definition file, wherein the previewing occurs via the user interface and before the using of the interactive media object definition file to render and present, via the media selection menu of the presentation device, the interactive media object defined by the interactive media object definition file.

In some examples, the method further includes: receiving, via a user interface of the presentation device, input; and using the input received via the user interface of the presentation device to modify the rendering and presentation of the interactive media object in accordance with the interactive media object definition file.

In some examples, the presentation device is a television, or a streaming media player connected to a television.

In some examples, the method further includes: obtaining user profile data associated with a user of the presentation device; and using the obtained user profile data to select, from among multiple template candidates, the designed template, wherein curating the designed template comprises curating the selected template.

In some examples, the method further includes: obtaining presentation area data associated with a presentation area of the presentation device; and using the obtained presentation area data to select, from among multiple template candidates, the designed template, wherein curating the designed template comprises curating the selected template.

In some examples, the template is a first template, the interactive media object definition file is a first interactive media object definition file, and the interactive media object is a first interactive media object, and the method further includes: (i) designing, by the template design module, a second template for an interactive media object, wherein the second template includes one or more fixed portions and one or more variable portions; (ii) curating, by the template curation module, the designed second template by at least (a) prompting for input via the user interface, (b) receiving input via the user interface, and (c) using the received input to modify the one or more variable portions of the designed second template; (iii) modifying, by the content service module, the curated second template by replacing a content placeholder of the curated template with a corresponding content item, thereby automatically converting the curated second template into a second interactive media object definition file; (iv) using, by the rendering module, the second interactive media object definition file to render and present, via the media selection menu of a presentation device, a second interactive media object defined by the second interactive media object definition file; (v) receiving, via a user interface of the presentation device, input associated with the first interactive media object; and (vi) using the input received via the user interface of the presentation device to modify the rendering and presentation of the second interactive media object in accordance with the second interactive media object definition file.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a system comprising a set of domain specific language (DSL)-compatible modules including (i) a template design module, (ii) a template curation module, (iii) a content services module, (iv) a rendering module, and (v) a preview module, the method comprising:
designing, by the template design module, a template for an interactive media object, wherein the template includes one or more fixed portions and one or more variable portions;
curating, by the template curation module, the designed template by at least (i) prompting for input via a user interface, (ii) receiving input via the user interface, and (iii) using the received input to modify the one or more variable portions of the designed template;
modifying, by the content services module, the curated template by replacing a content placeholder of the curated template with a corresponding content item, thereby automatically converting the curated template into an interactive media object definition file;
using, by the rendering module, the interactive media object definition file to render and present, via a media selection menu of a presentation device, an interactive media object defined by the interactive media object definition file; and
previewing, by the preview module, an interactive media object represented by the interactive media object definition file, wherein the previewing occurs via the user interface and before the using of the interactive media object definition file to render and present, via the media selection menu of the presentation device, the interactive media object defined by the interactive media object definition file.

2. The method of claim 1, wherein the DSL-compatible modules are JSON file compatible modules.

3. The method of claim 1, wherein the interactive media object is an interactive advertisement.

4. The method of claim 1, wherein the designed template defines:
a hierarchy of at least two components,
wherein each component includes at least one user interface interaction, and
wherein each user interface interaction includes at least one trigger condition and at least one action.

5. The method of claim 4, wherein the designed template specifies that at least one of the components is a root component.

6. The method of claim 4, wherein the designed template specifies that at least one defined components is an image, video, or button component.

7. The method of claim 4, wherein the designed template specifies that at least one of the defined trigger conditions is receipt of a particular input via the user interface.

8. The method of claim 4, wherein the designed template specifies that at least one of the defined trigger conditions is a condition related to user profile data, wherein the method further comprises:
obtaining user profile data associated with a user of the presentation device; and
using the obtained user profile data to modify the rendering and presentation of the interactive media object in accordance with the interactive media object definition file.

9. The method of claim 4, wherein the designed template specifies that at least one of the defined trigger conditions is a condition related to presentation area data, wherein the method further comprises:
obtaining presentation area data associated with a presentation area of the presentation device; and
using the obtained presentation area data to modify the rendering and presentation of the interactive media object in accordance with the interactive media object definition file.

10. The method of claim 4, wherein the designed template specifies that at least one of the defined actions is a media presentation-related action.

11. The method of claim 1, further comprising:
receiving, via a user interface of the presentation device, input; and
using the input received via the user interface of the presentation device to modify the rendering and presentation of the interactive media object in accordance with the interactive media object definition file.

12. The method of claim 1, wherein the presentation device is a television, or a streaming media player connected to a television.

13. The method of claim 1, further comprising:
obtaining user profile data associated with a user of the presentation device; and
using the obtained user profile data to select, from among multiple template candidates, the designed template,
wherein curating the designed template comprises curating the selected template.

14. The method of claim 1, further comprising:
obtaining presentation area data associated with a presentation area of the presentation device; and
using the obtained presentation area data to select, from among multiple template candidates, the designed template,
wherein curating the designed template comprises curating the selected template.

15. The method of claim 1, wherein the template is a first template, the interactive media object definition file is a first interactive media object definition file, and the interactive media object is a first interactive media object, the method further comprising:
designing, by the template design module, a second template for an interactive media object, wherein the second template includes one or more fixed portions and one or more variable portions;
curating, by the template curation module, the designed second template by at least (i) prompting for input via the user interface, (ii) receiving input via the user interface, and (iii) using the received input to modify the one or more variable portions of the designed second template;

modifying, by the content services module, the curated second template by replacing a content placeholder of the curated template with a corresponding content item, thereby automatically converting the curated second template into a second interactive media object definition file;

using, by the rendering module, the second interactive media object definition file to render and present, via the media selection menu of a presentation device, a second interactive media object defined by the second interactive media object definition file;

receiving, via a user interface of the presentation device, input associated with the first interactive media object; and using the input received via the user interface of the presentation device to modify the rendering and presentation of the second interactive media object in accordance with the second interactive media object definition file.

16. A computing system comprising one or more processors and one or more non-transitory computer-readable storage media having stored thereon program instructions that upon execution by the one or more processors, cause the computing system to perform a set of acts for use in connection with a set of domain specific language (DSL)-compatible modules including (i) a template design module, (ii) a template curation module, (iii) a content services module, (iv) a rendering module, and (v) a preview module, the set of acts comprising:

designing, by the template design module, a template for an interactive media object, wherein the template includes one or more fixed portions and one or more variable portions;

curating, by the template curation module, the designed template by at least (i) prompting for input via a user interface, (ii) receiving input via the user interface, and (iii) using the received input to modify the one or more variable portions of the designed template;

modifying, by the content services module, the curated template by replacing a content placeholder of the curated template with a corresponding content item, thereby automatically converting the curated template into an interactive media object definition file;

using, by the rendering module, the interactive media object definition file to render and present, via a media selection menu of a presentation device, an interactive media object defined by the interactive media object definition file; and previewing, by the preview module, an interactive media object represented by the interactive media object definition file, wherein the previewing occurs via the user interface and before the using of the interactive media object definition file to render and present, via the media selection menu of the presentation device, the interactive media object defined by the interactive media object definition file.

17. The computing system of claim 16, wherein the designed template defines:

a hierarchy of at least two components, wherein each component includes at least one user interface interaction, and wherein each user interface interaction includes at least one trigger condition and at least one action.

18. The computing system of claim 17, wherein the designed template specifies that at least one of the defined trigger conditions is a condition related to user profile data, wherein the set of acts further comprises:

obtaining user profile data associated with a user of the presentation device; and using the obtained user profile data to modify the rendering and presentation of the interactive media object in accordance with the interactive media object definition file.

19. One or more non-transitory computer-readable storage medium having stored thereon program instructions that upon execution by one or more processors, cause a computing system to perform a set of acts for use in connection with a set of domain specific language (DSL)-compatible modules including (i) a template design module, (ii) a template curation module, (iii) a content services module, (iv) a rendering module, and (v) a preview module, and wherein the set of acts comprises:

designing, by the template design module, a template for an interactive media object, wherein the template includes one or more fixed portions and one or more variable portions;

curating, by the template curation module, the designed template by at least (i) prompting for input via a user interface, (ii) receiving input via the user interface, and (iii) using the received input to modify the one or more variable portions of the designed template;

modifying, by the content services module, the curated template by replacing a content placeholder of the curated template with a corresponding content item, thereby automatically converting the curated template into an interactive media object definition file;

using, by the rendering module, the interactive media object definition file to render and present, via a media selection menu of a presentation device, an interactive media object defined by the interactive media object definition file; and previewing, by the preview module, an interactive media object represented by the interactive media object definition file, wherein the previewing occurs via the user interface and before the using of the interactive media object definition file to render and present, via the media selection menu of the presentation device, the interactive media object defined by the interactive media object definition file.

* * * * *